(12) United States Patent
Janssen

(10) Patent No.: US 6,783,250 B2
(45) Date of Patent: Aug. 31, 2004

(54) EFFICIENT LIGHT COLLECTOR FOR PROJECTION DISPLAY SYSTEM

(75) Inventor: Peter J Janssen, Scarborough, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/254,272

(22) Filed: Sep. 25, 2002

(65) Prior Publication Data

US 2004/0057026 A1 Mar. 25, 2004

(51) Int. Cl.⁷ .............................. G03B 21/28; F21V 7/00
(52) U.S. Cl. ........................ 353/99; 353/98; 362/296; 362/297; 362/304; 362/346
(58) Field of Search ............... 353/98, 99; 362/511, 362/512, 296, 297, 304, 346, 551, 560

(56) References Cited

U.S. PATENT DOCUMENTS

| | | | |
|---|---|---|---|
| 5,123,729 A | * 6/1992 | Kondo et al. ............... 353/99 |
| 5,410,370 A | 4/1995 | Janssen ..................... 348/756 |
| 5,416,514 A | 5/1995 | Janssen et al. .............. 348/196 |
| 5,581,683 A | * 12/1996 | Bertignoll et al. .......... 385/146 |
| 5,607,229 A | * 3/1997 | Rykowski et al. .......... 362/346 |
| 5,755,503 A | * 5/1998 | Chen et al. ................... 353/38 |
| 5,857,041 A | * 1/1999 | Riser et al. .................. 385/31 |
| 5,938,317 A | * 8/1999 | Thornton .................... 362/290 |
| 5,971,571 A | * 10/1999 | Rose ......................... 362/346 |
| 6,123,436 A | * 9/2000 | Hough et al. ............... 362/296 |
| 6,231,199 B1 | * 5/2001 | Li ............................. 359/857 |
| 6,382,513 B1 | * 5/2002 | Dvorkis et al. ........ 235/462.37 |
| 6,418,253 B2 | * 7/2002 | Whitehead ................... 385/31 |

* cited by examiner

Primary Examiner—Russell Adams
Assistant Examiner—Michael Dalakis (57) ABSTRACT

A light collection for an arc lamp includes a parabolic reflector having primary and secondary parabolic reflector sections, the secondary parabolic reflector section divided into subsections, resulting in multiple arc images. The light collection system combines high efficiency and etendue preserving aperture shaping, and is particularly useful in projection display systems.

16 Claims, 7 Drawing Sheets

EFFICIENT LIGHT COLLECTOR FOR PROJECTION DISPLAY SYSTEM

TECHNICAL FIELD

This invention relates to light collection systems, and more particularly relates to a light collection system for the collection of light from an intense light source such as an arc lamp, which light is to be employed in a projection display system.

BACKGROUND AND SUMMARY

Projection display systems employ intense light sources in order to provide sufficient light for a bright display at the viewing screen after modulation of the light by one or more light valves. Light sources widely used for this purpose include arc lamps such as UHP and xenon lamps. The elongated shape of the arc of such lamps presents a challenge to the designer to provide efficient optical systems for the collection and shaping of the emitted light for subsequent modulation and display.

The most common light collection method in projection is based on a parabolic or elliptical reflector and a lenticular array to correct for non-uniformity of the light source. Due to the large aberrations typical of these reflector types and the mismatch between light source and lenticular geometry, etendue (angular extent of the beam) is not preserved. This accounts for the poor light utilization of present projectors, especially in the case of small light valves.

U.S. Pat. No. 6,231,199, issued to Li on May 15, 2001, teaches an optical system for collecting and condensing light from one or more arc lamps down to a small spot size for coupling to a target such as the input face of a single optical fiber. The system includes a retro-reflector for effectively doubling the light output of the arc lamp, and a plurality of concave paraboloid reflectors.

Figure 1A:
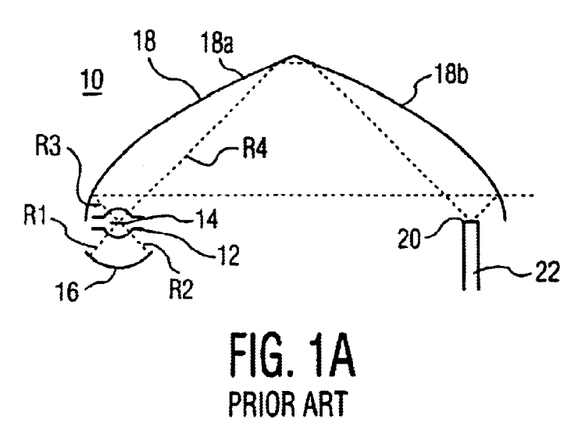
Figure 1B:
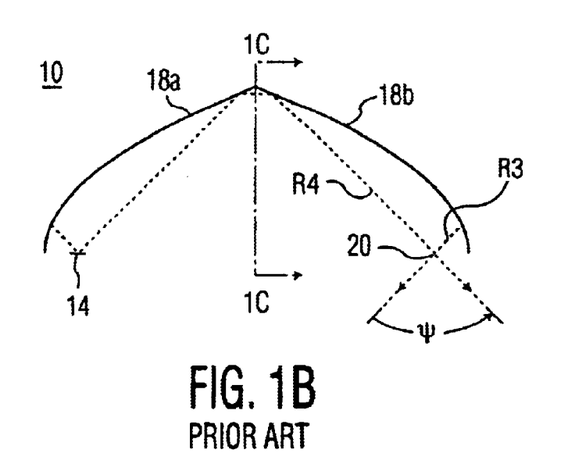
Figure 1C:
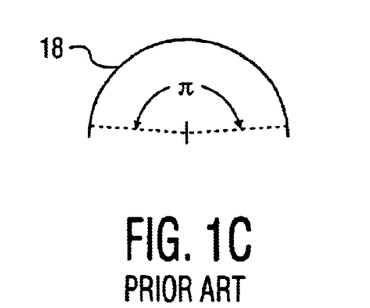
FIG. 1C is a cross-section view of a light collection system of the prior art for use with an arc lamp light source, having a compound parabolic reflector with primary and secondary parabolic sections.

An exemplary arrangement using two parabolic reflectors back-to-back to create an arc image at near unit magnification is shown in Applicant's FIGS. 1A through 1C.

FIG. 1A is a longitudinal section view of a light collection system 10 for an arc lamp light source 12 having an elongated arc 14. This view corresponds to the axial image plane of arc 14. The light collection system includes retro-reflector 16 and a compound parabolic reflector 18, composed of primary and secondary parabolic reflector sections 18a and 18b. Light from the lamp represented by rays R1 and R2 is retro-reflected back onto the arc 14 by retro-reflector 16. Parabolic reflector sections 18a and 18b are coaxial, and arc 14 is located at the focus of the primary parabolic reflector section 18a. Light from arc 14, represented by rays R3 and R4, thus forms arc image 20 at the focus of the secondary parabolic reflector 18b, where an entrance face 22a of optic fiber 22 is positioned.

Because of the symmetry of this arrangement the huge aberrations of a parabola are largely cancelled. The cone angles of the light emitted from the arc are determined by the lamp's radiation characteristic. The cone angles of the present UHP lamp are very large. As shown in FIGS. 1B and 1C, the cone angle $\psi$ in the axial image plane, and the cone angle $\pi$ in the radial plane (view AA'), are about 90 degrees and 180 degrees, respectively, producing an anamorphic cone. Cone angles this large can not be handled downstream by conventional imaging optics. Non-imaging shaping means, e.g., a parabolic reflector, would re-introduce the parabolic aberrations, defeating the purpose of the concept.

Thus, although the arrangement of FIG. 1 makes the arc image 20 accessible, it does not solve the problem of how to carry the light from there efficiently and in a manner which preserves etendue.

In accordance with the invention, the secondary parabolic section is split into segments and each segment is shifted either longitudinally (along the arc axis) or radially (about the arc axis), causing the formation of multiple arc images (one for each segment) which are correspondingly shifted with to the arc axis.

The light cone associated with each segment can be made arbitrarily small such that each arc image can be accommodated by conventional optics. Preferably, however, each arc image from the light collection system is directly coupled into a loss-less, etendue-preserving light guide of the type described in co-pending U.S. patent application Ser. No. 10/161,798, filed Jun. 4, 2002 assigned to the present Assignee By providing a separate light guide input section for each arc image having an input face sized to fit the arc image and then inputting the images separately) into a light guide body section having a common input a sized to fit the array of arc images, aperture shaping can be achieved, for instance, concatenating the separate images by aligning them end-to-end to match the stripe geometry required for a single panel scrolling color projector.

A "fitting" light guide is one which has an input face sized to fit a single arc image or an array of arc images which are adjoining or partially overlapping, but not completely superimposed.

According to one aspect of the invention, a light collection system comprises a parabolic reflector, the parabolic reflector comprising a primary parabolic reflector section and a secondary parabolic reflector section, the sections being paraboloid sections and being positioned coaxially with respect to one another, so that an object placed at the focal point of the primary parabolic reflector section is imaged at the focal point of the secondary parabolic reflector section, characterized in that the secondary parabolic reflector section is divided into a plurality of segments, whereby for each segment, a separate image is produced.

According to another aspect of the invention, a light engine for a projection display system is provided, the light engine comprising the light collection system of the invention, and a loss-less, etendue-preserving light pipe having a plurality of input faces and an output face, each input face positioned to input one of the plurality of images produced by the light collection system.

According to a further aspect of the invention, a projection display system is provided, the system comprising the light engine of the invention, at least one light valve for modulating light from the light engine to produce a display in accordance with a display signal, and a projection lens for projecting the display onto a display surface.

The light collection system of the invention provides low aberration reflective optics that can be replicated at low cost, and enables high-efficiency light collection and aperture shaping without loss of etendue. This opens the way for high-efficiency projection with small size light valves. Particularly, single panel scrolling color systems using narrow stripe illumination will benefit from this invention.

BRIEF DESCRIPTION OF THE DRAWING FIGURES

FIGS. 1A and 1B are longitudinal section views.

FIGS. 4A, 4B and 4C are side elevation views.

DETAILED DESCRIPTION

Figure 2A:
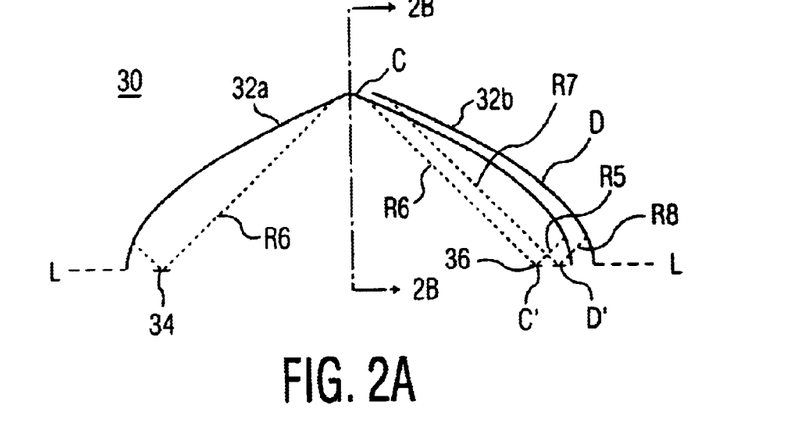
FIG. 2A is a longitudinal section view of the compound parabolic reflector of FIGS. 1A and 1B, showing a modification of the secondary parabolic section in accordance with the invention.
Figure 2B:
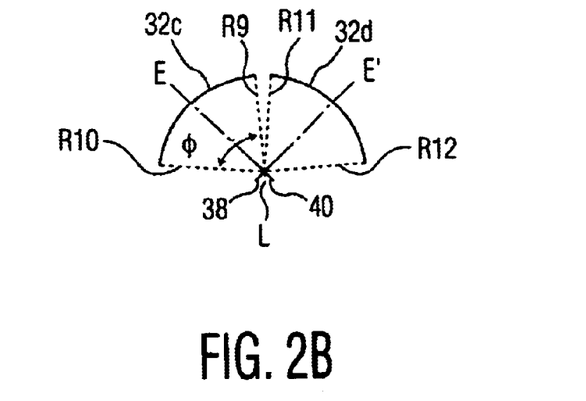
FIG. 2B is a cross-section view similar to that of FIG. 1C, showing another modification of the secondary parabolic section in accordance with the invention.
Figure 2C:
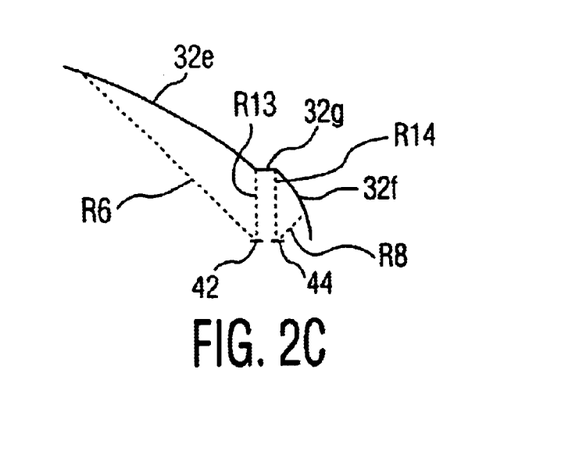
FIG. 2C is a longitudinal section view of a compound secondary parabolic section of a compound parabolic reflector of the invention.

FIGS. 2A through 2C illustrate one way of dividing the secondary parabolic reflector into multiple segments, radially as well as axially. FIG. 2A, a longitudinal section view of compound parabolic reflector 30, shows how moving the secondary parabolic reflector section 32b away from parabolic reflector section 32a along longitudinal axis L from position C to position D, results in moving the image of arc 34 along axis L from position C' to position D'.

Figure 3A:
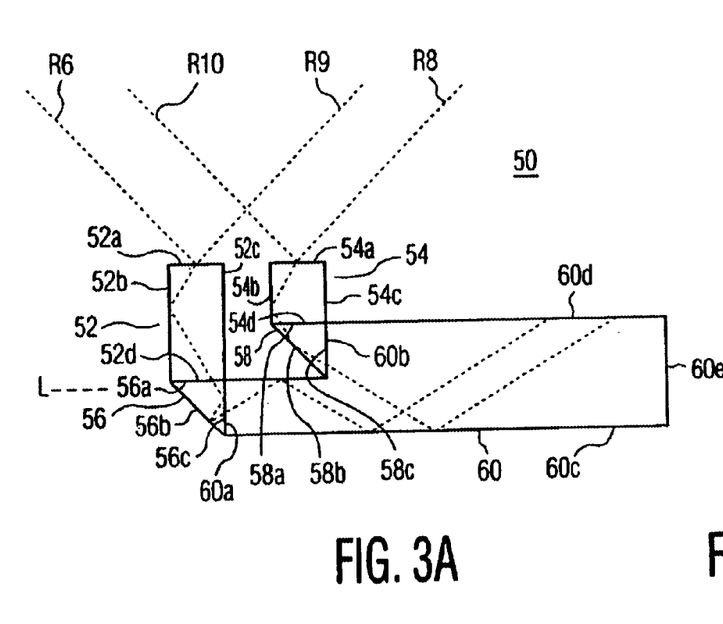
FIG. 3A is a side elevation view of one embodiment of a light guide for the loss-less guiding of light from the collection system of FIGS. 2B and 2C.

FIG. 2C shows that by dividing secondary parabolic reflector section 32b into segments 32e and 32f, and shifting these segments axially away from the primary parabolic reflector 32a, an array of images (42, 44) along axis L are produced. Segments 32e and 32f are connected by an annular band 32g. As light cones of smaller angular extent (defined by rays; R6 and R13, and R8 and R14, respectively) are associated with each segment, the images produced by these light cones can be individually handled more easily by the downstream optics, e.g., by the light guides as shown in FIGS. 3, 4 and 5.

FIG. 2B, a section view BB', shows that by dividing secondary parabolic reflector section 32b into segments 32c and 32d, and shifting these segments radially away from one another, an array of separate images (38, 40) are produced on either side of axis L by light cones of angular extent φ, defined by rays R9 and R10, and R11 and R12, respectively.

Splitting the secondary reflector section into even smaller segments and shifting each segment either axially or radially enables the production of light cones associated with each image of arbitrarily small angular extent, such that each image can be accommodated easily by "conventional" optics.

However, a preferred way of handling the images is to directly couple each image into a fitting light guide. This type of light guide is described in my co-pending U.S. patent application Ser. No. 10/161,798, filed Jun. 4, 2002 entitled "Loss-less etendue preserving Light guide including bends", the disclosure of which is incorporated herein by reference.

One embodiment of a fitting light guide suitable for assembling multiple images is shown in FIG. 3. The light guide 50 has a pair of input sections 52 and 54, spaced apart to input arc images 42 and 44 from the secondary parabolic reflector section 32b in FIG. 2C, at input faces 52a and 54a, respectively. The light rays from the two arc 42 and 44, represented by rays R9 and R8, respectively, are guided by sidewalls (52b, 52c) and (54b, 54c) of input guide sections 52 and 54 to output faces 52d and 54d, respectively, whence they enter coupling sections 56 and 58 through input faces 56a and 58a, respectively. The rays are guided by internal reflection from faces 56b, 56c, 58b, 58c to output faces 56c and 58c, respectively. The angle of incidence of the rays on faces 56c and 58c determines whether the rays are internally reflected or outputted to main guide section 60. Thence, the rays are inputted to main guide section via stepped input faces 60a and 60b, and guided by sidewalls 60c and 60d to common output face 60e.

Figure 3B:
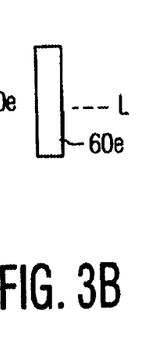
FIGS. 3B and 3C are end views of an output face and an input face, respectively, of the light guide of FIG. 3A.
Figure 3C:
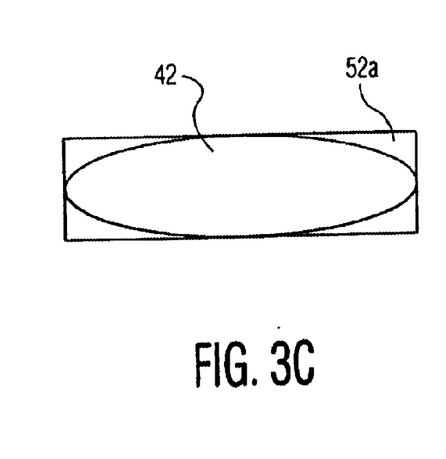

In addition to loss-less, etendue-preserving guiding of light, the light guide also achieves aperture shaping, by concatenating the images 42 and 44, and conforming them to the cross-sectional shape of the main guide section 60, which corresponds to the shape of output face 60e, shown in the end view of FIG. 3B. This cross-sectional shape is an elongated rectangle, for instance to match the stripe geometry in scrolling color projection.

Another embodiment of a fitting light guide, which is suitable for assembling multiple off-normal arc images is shown in FIG. 4. Off-normal arc images are formed by light cones whose axes are neither perpendicular to the L (arc/parabola) axis nor lying in the axial plane (plane of the page) and are formed by radial segments. Examples of off-normal arc images are arc images 38 and 40 in FIG. 2B, whose associated light cones have axes E and E', respectively. FIGS. 4A, 4B and 4C are side elevation views of a compound light guide 70 (FIG. 4A) composed of a pair of light guides 72 (FIG. 4B) and 74 (FIG. 4C) sandwiched together. Light guide 72 includes input section 76 having a fitting input face 76a for inputting arc image 38, an internally reflecting face 76b and output face 76c. Joined to input section 76 is light guide body section 78, having input face 78a, sidewalls 78b and 78c, and an output face, not shown. Light guide 74 includes compound input section 80, having segments 82, 84 and 86. Input segments 82 and 84 each have an input face (82a, 84a) which together form a fitting input face (82a, 84a) for inputting arc image 40. Each segment (82, 84, 86) also has one or more internally reflecting faces (82b, 86b and 84a, 84d, depending on the angle of incidence) and a common output face (84d, 86c). Joined to input section 80 is light guide body section 88, having input face 88a, sidewalls 88b and 88c, and an output face, not shown.

Figure 4A:
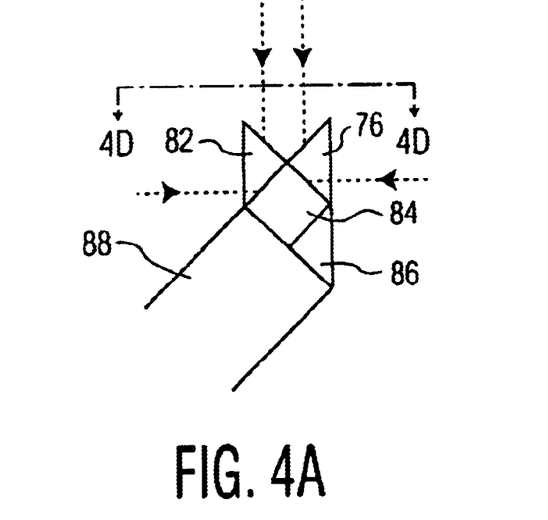
Figure 4B:
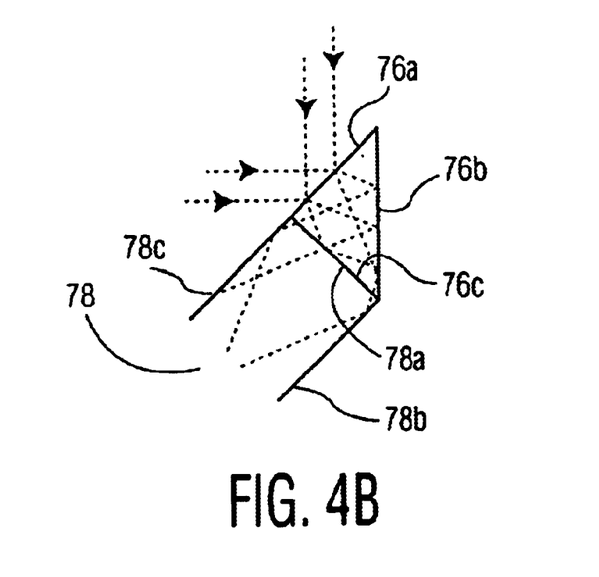
Figure 4C:
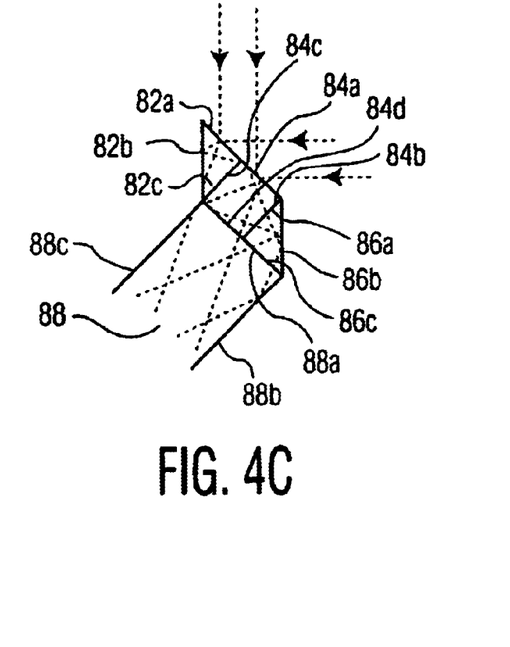
Figure 4D:
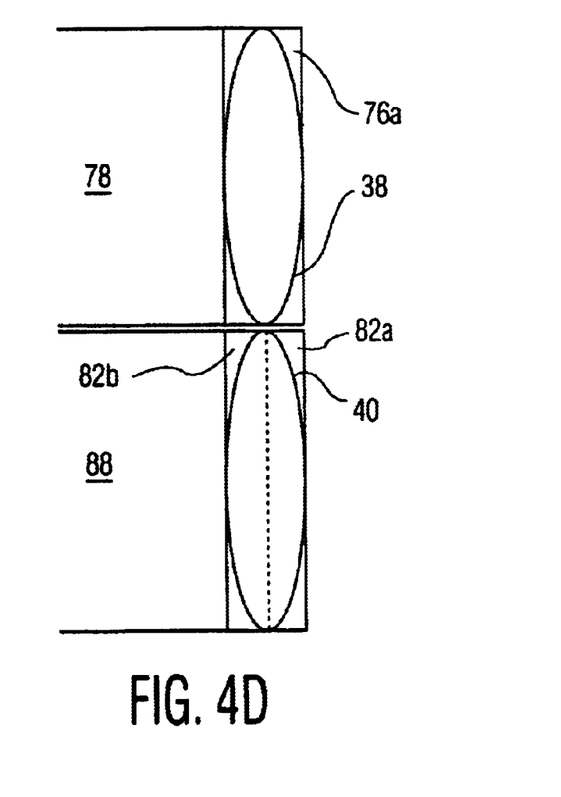
FIG. 4D is an end view, of another embodiment of a light guide for the loss-less light guiding of light from the collection system of FIGS. 2B and 2C.
Figure 5:
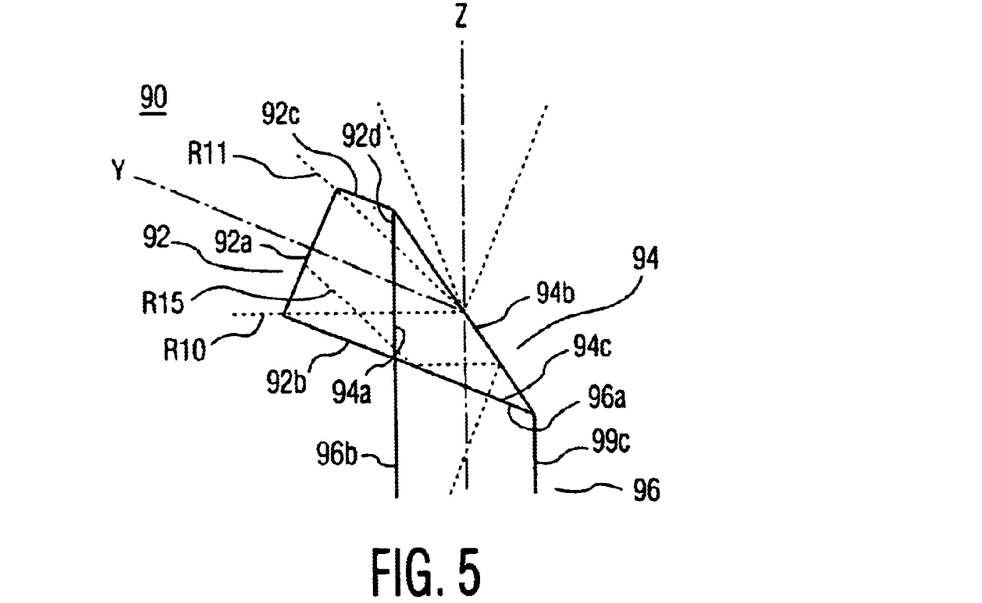
FIG. 5 is a side elevation view of an embodiment of a light guide for the loss-less bending of light.

FIG. 4D is a top view G—G' of the compound light guide 70 showing the arc images 38 and 40 incident on the fitting input faces 76a and (82a, 84a), which are in turn in contact with body sections 78 and 88, respectively.

Off-normal arc images which are not aligned can be aligned to a preferred common orientation by passing them around a bend or fold in a loss-less light guide. This is accomplished inherently in the compound light guide 70 of FIG. 4. FIG. 5 shows another embodiment of a light guide 90 with a bend or fold, enabling loss-less transport of light "around the corner". Output surface 92d of straight light guide 92 and input surface 96a of straight light guide 96, having longitudinal axes Y and Z, respectively, are coupled with coupling element 94, having an input surface 94a and internally reflecting surfaces 94b and 94c. Output surface 94c of coupling element 94 is either internally reflecting or transparent to the guided light, depending on the angle of incidence, as demonstrated by the path of light ray R15.

Such a light guide with a fold is particularly useful in the present invention, in that off-normal light from a radial segment (represented by rays R10 and R11) can be re-aligned to a preferred common orientation.

The light collection system of the invention is useful in any application where efficient collection and/or beam shaping of an elongated arc light source is needed, particularly projection display systems. The light collection system of the invention is especially useful in single panel color projection display systems.

A single panel scrolling color projection display system is characterized by a single light modulator panel such as a liquid crystal display (LCD) panel having a raster of individual picture elements or pixels, which panel is illuminated by horizontally elongated red, green and blue illumination bars or stripes. The stripes are continuously scrolled vertically across the panel while synchronously addressing the rows of pixels with display information corresponding to the color of the then incident stripe. See, for example, U.S. Pat. No. 5,410,370, "Single panel color projection video display improved scanning" issued to P. Janssen on Mar. 25, 1994, and U.S. Pat. No. 5,416,514, "Single panel color projection video display having control circuitry for synchronizing the color illumination system with reading/writing of the light valve" issued to P. Janssen et al. on May 16, 1995, the entire disclosures of which are hereby incorporated herein by reference.

Figure 6:
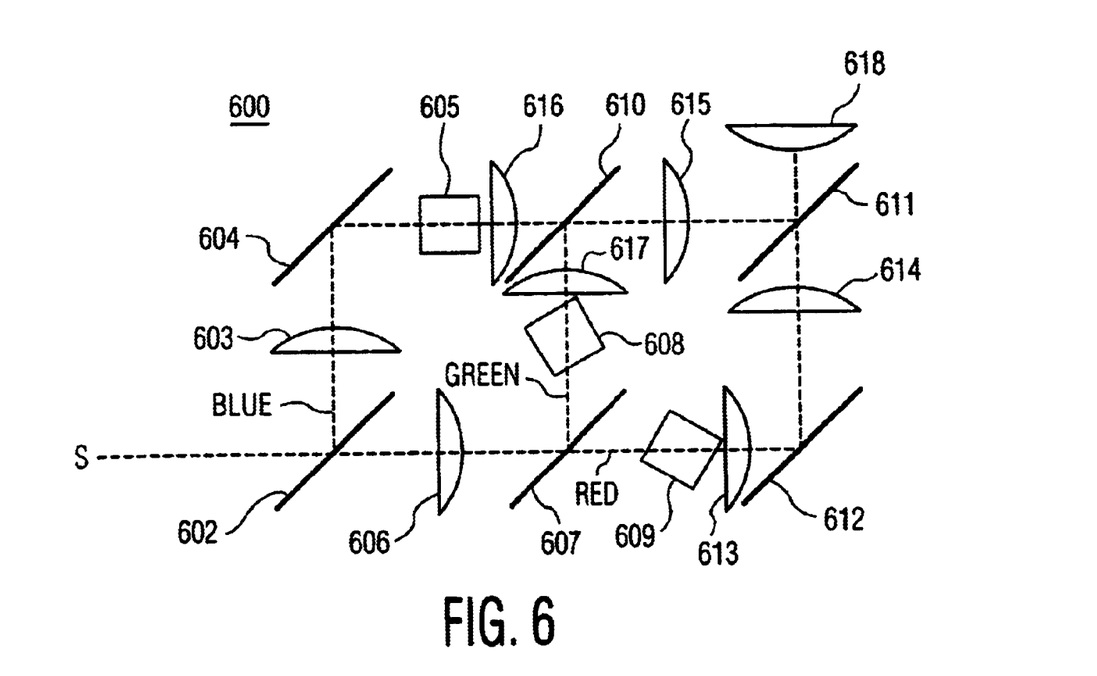
FIG. 6 is a schematic illustration of a light beam splitting and scrolling engine.

FIG. 6 is a schematic illustration of a beam splitting and scrolling engine 600 used in such a single panel scrolling color display system. White light from source S is split into a Blue component and a Green/Red component G/R by dichroic element 2. The Blue component is directed by lens 603 and mirror 604 to prism scanner 605. The G/R component is passed by dichroic element 602 through lens 606 to dichroic element 607, which splits the G/R component into a Green component and a Red component. The Green component is reflected by element 607 to prism scanner 608, while the Red component is passed through dichroic element 607 to prism scanner 609. The scanned Red, Green, Blue components are then directed to recombination dichroic elements 610 and 611 by mirror 612 and relay lenses 613 through 617.

Figure 7:
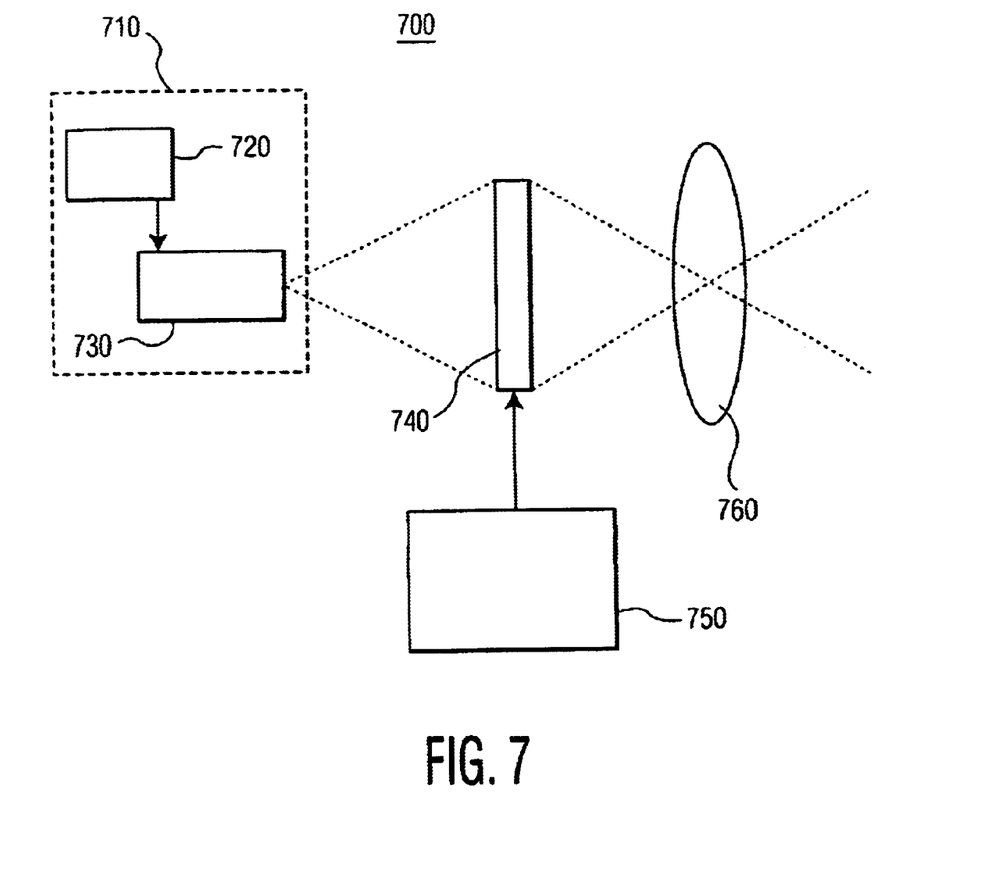
FIG. 7 is a schematic illustration of a light valve projection display system including the light collection system of FIGS. 2–5 and the beam splitting and scrolling engine of FIG. 6.

FIG. 7 is a block diagram of a single panel color projection display system 700 incorporating a light collection system of the invention. Light engine 710 includes light collection system 720, which a light collecting parabolic reflector such as that shown in FIG. 2, and a light guide of the type shown in FIGS. 3–5. Light collection system 720 provides an illumination beam of stripe-shaped cross-section to beam splitting and scrolling engine 730. Engine 730 generates sequentially scrolling red, green and blue stripes, for sequentially scrolling across the surface of light valve panel 740, which modulates the scrolling light beams synchronously with the input of display information from electrical signal input source 750. Projection lens 760 projects the modulated light onto a display surface, not shown.

The invention has necessarily been described in terms of a limited number of embodiments. From this description, other embodiments and variations of embodiments will become apparent to those skilled in the art, and are intended to be fully encompassed within the scope of the invention and the appended claims.

What is claimed is:

1. A light collection system comprising a parabolic reflector, the parabolic reflector comprising a compound parabolic reflector surface having a first focal point and a second focal point, the compound parabolic reflector surface comprising a primary parabolic reflector section defining the first focal point and a secondary parabolic reflector section defining second focal point, the sections being paraboloid sections and being positioned coaxially with respect to one another, so that a light source placed at the first focal point defined by the primary parabolic reflector section is imaged at the second focal point defined by the secondary parabolic reflector section, characterized in that the secondary parabolic reflector section is divided into a plurality of segments, whereby for each segment, a separate focal point is defined and a separate image is produced.

2. The light collection system of claim 1 in which the secondary parabolic reflector section is divided into at least two paraboloid segments displaced longitudinally from one another.

3. The light collection system of claim 2 in which the paraboloid segments are longitudinal segments and the segments are connected by an annular band.

4. The light collection system of claim 2 in which at least one of the paraboloid segments of the secondary parabolic reflector section is divided into at least two radial paraboloid segments displaced longitudinally from one another.

5. The light collection system of claim 1 in which a retro-reflector is provided behind the light source in opposing relationship to the primary parabolic reflector, to retroreflect light from the light source back to the light source.

6. A light engine for a projection display system comprising the light collection system of claim 1, and light guiding means including at least one light guide having at least one input face and at least one output face, each input face positioned to input one of the plurality of images produced by the light collection system.

7. The light engine of claim 6 in which the light guide has at least one bend.

8. The light engine of claim 6 in which the output face of the light guide has the shape of an elongate rectangle, resulting in the output light having a beam cross-section in the shape of an elongated stripe.

9. A light engine for a projection display system comprising: (a) a light collection system comprising a parabolic reflector, the parabolic reflector comprising a compound parabolic reflector surface having a first focal point and a second focal point, the compound parabolic reflector surface comprising a primary parabolic reflector section defining the first focal point and a secondary parabolic reflector section defining second focal point, the sections being paraboloid sections and being positioned coaxially with respect to one another, so that a light source placed at the first focal point defined by the primary parabolic reflector section is imaged at the second focal point defined by the secondary parabolic reflector section, characterized in that the secondary parabolic reflector section is divided into a plurality of segments, whereby for each segment, a separate focal point is defined and a separate image is produced; (b) light guiding means including at least one light guide having at least one input face and at least one output face, each input face positioned to input one of the plurality of images produced by the light collection system in which the light guide comprises:

a main section having;
  a longitudinal axis,
  a stepped input end with a plurality of input faces displaced longitudinally from one another, and
  an output end having an output face,
    a plurality of input sections, each having an input face and an output face, and
    a plurality of coupling sections for coupling the input sections to the main section, each coupling section positioned between an output face of an input section and an input face of the main section.

10. The light engine of claim 9 in which the output face of the main section of the light guide has the shape of an elongate rectangle, resulting in the output light having a beam cross-section in the shape of an elongated stripe.

11. The light engine of claim 6, in which the light guiding means comprises at least first and second light guides, each light guide having a main section with an input end having an input face and an output end having an output face, the main sections arranged in side-by-side orientation,
  at least first and second input sections, each having an input face and an output face, the input face of the first section inclined to input off-normal light from a first direction, and the input face of the second section inclined to input off-normal light from a second direction, and the first and second output faces coupled to the first and second input faces of the first and second main sections, respectively.

12. The light engine of claim 11 in which the output faces of the main sections of the light guides together have the shape of an elongate rectangle, resulting in the output light having a beam cross-section in the shape of an elongated stripe.

13. The light engine of claim 6 in which means are included for splitting the output light into red, green and blue beams, and for sequentially scrolling these beams across the surface of a light valve.

14. A projection display system comprising the light engine of claim 6, at least one light valve for modulating light from the light engine to produce a display in accordance with a display signal, and a projection lens for projecting the display onto a display surface.

15. A projection display system comprising the light engine of claim 8, a single light valve for modulating red, green and blue light synchronously with the scrolling of the red, green and blue color stripes from the light engine to produce a display in accordance with a display signal, and a projection lens for projecting the display onto a display surface.

16. The projection display system of claim 15 in which the light valve is a reflective liquid crystal display panel.

* * * * *